Jan. 26, 1971

M. R. SWINEHART 3,558,995

BIDIRECTIONAL THYRISTOR SWITCHING ON-OFF CONTROL
SYSTEMS FOR AN INDUCTIVE LOAD

Filed Aug. 24, 1967

Inventor
Merle R. Swinehart
By *Wm. A. Austin*
Attorney

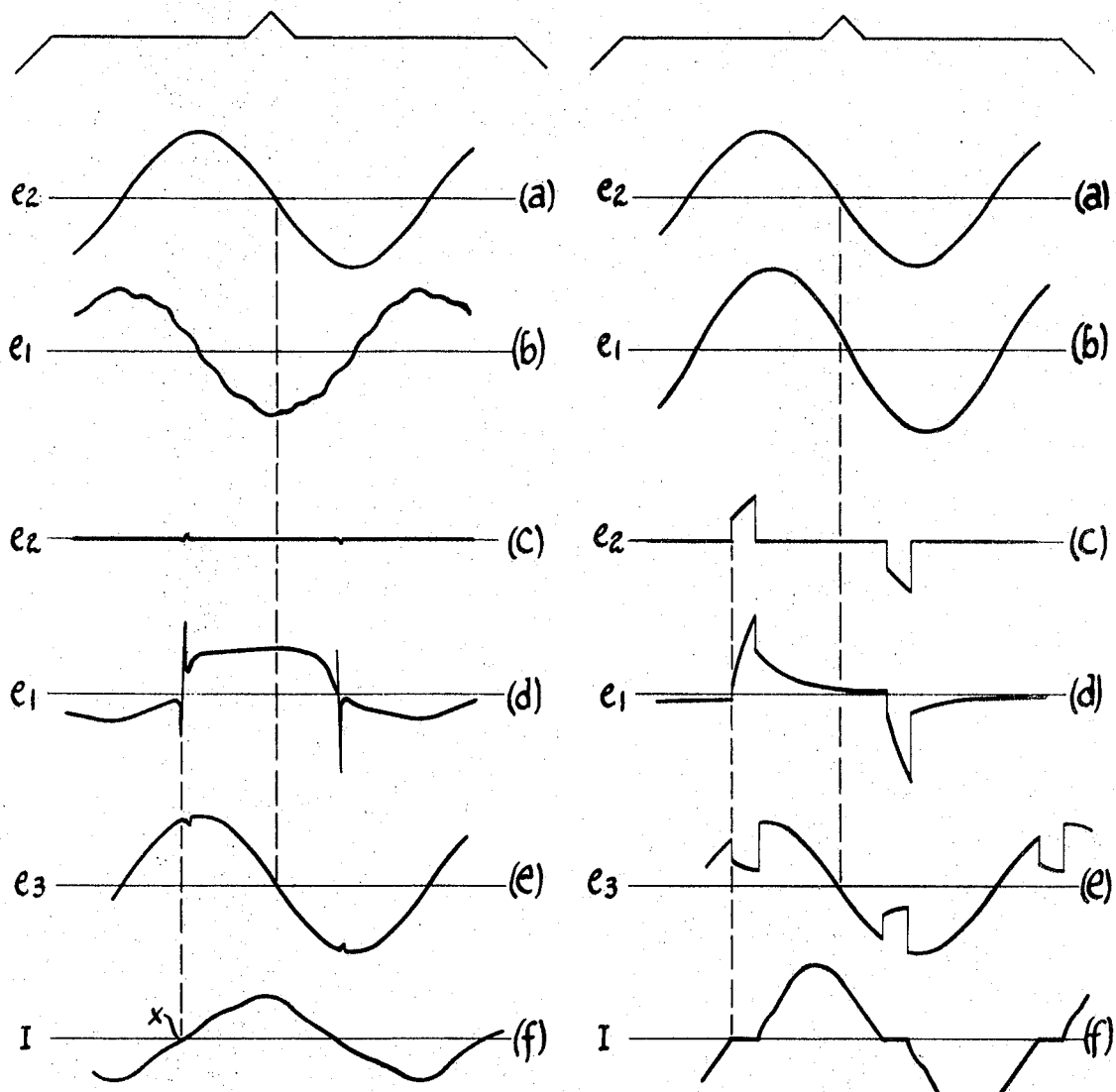

Jan. 26, 1971          M. R. SWINEHART          3,558,995
       BIDIRECTIONAL THYRISTOR SWITCHING ON-OFF CONTROL
                 SYSTEMS FOR AN INDUCTIVE LOAD
Filed Aug. 24, 1967                         3 Sheets-Sheet 3

Inventor
Merle R. Swinehart
By *Wm. A. Austin*
Attorney

United States Patent Office 3,558,995
Patented Jan. 26, 1971

3,558,995
BIDIRECTIONAL THYRISTOR SWITCHING ON-OFF CONTROL SYSTEMS FOR AN INDUCTIVE LOAD
Merle R. Swinehart, Brookfield, Wis., assignor to Cutler-Hammer, Inc., Milwaukee, Wis., a corporation of Delaware
Filed Aug. 24, 1967, Ser. No. 663,069
Int. Cl. H01h 47/32
U.S. Cl. 317—130                                3 Claims

ABSTRACT OF THE DISCLOSURE

An "on-off" control system which responds to discrete, presettable value of a gradually varying condition such as temperature, light, humidity, manually or automatically variable resistor, etc., to energize or deenergize an inductive load. By interchanging the resistance and capacitance devices from their normal positions in the firing control circuit of a solid state gating type power control element of the full-wave switching type such as a "Quadrac" or "Triac," the power will be switched either on or off, at least for inductive loads, as a function of the value of the resistance.

BACKGROUND OF THE INVENTION

This invention relates to the field of "on-off" control or switching control of electrical load devices manually under control of an adjustable impedance or automatically in response to a variable external condition such as a gradually or steplessly varying condition. More specifically, the invention relates to on-off control of an inductive load device at a discrete adjustable value of a variable external condition wherein such condition is sensed by a variable resistor sensor such as a thermistor, photoresistor, humidity cell or the like. For example, the on-off control may be applied to turn on lights when it gets dark in the evening and to turn them off in response to daylight in the morning. Also, the on-off control may be applied to turn a heater relay or other inductive device on or off in response to temperature change, to turn a humidifier or dehumidifier relay on or off in response to sensing a change in the humidity of the surrounding air or to control a motor or other inductive device in response to a variable condition which may be sensed by a resistive change element.

The state of the prior art in this field is such that on-off control devices generally have been known in some condition responsive applications. However, these prior art devices have not been wholly satisfactory due to limited application or limited performance and the complexity and cost of circuits required to overcome some of their handicaps. For example, photo-sensitive devices for controlling electro-thermal relays or the like to light lamps when darkness approaches and for extinguishing the lamps in response to daylight in the morning have been known. Both the gradually responsive type and switching action type systems have been known in these prior devices. However, these prior known devices have not had the simplicity of construction and efficiency and reliability of performance of the invention hereinafter described.

SUMMARY OF THE INVENTION

Proportional control systems are known wherein an adjustable resistor is adjusted to vary the current flow to a capacitor on each half-cycle of an A.C. voltage and the capacitor upon receiving a given "breakover" voltage discharges through a trigger diode into the gate of a solid state gating type power control element. The rate of capacitor charge determined the amount of power applied to the load. Such system is of the "proportional" control type because a variation in the resistor proportionally varies the firing angle of the power control element and consequently the power applied to the load.

It has been discovered that essentially a simple modification in such proportional control system provides an "on-off" control system, that is, a system having switching action rather than continuous or stepless control. It has been discovered that when an inductive load is being controlled, interchanging the positions of the variable resistor and capacitor affords on-off or switching action control. This basic circuit may then be modified or added to in various ways to afford the desired sensitivity, range, magnitude, etc., for specific applications as hereinafter more fully described.

An object of the invention is to provide an improved electrical on-off control circuit.

A more specific object of the invention is to provide an improved condition responsive system for on-off control of an electrical load device.

Another specific object of the invention is to provide a control system for the aforementioned type which is especially adapted for miniaturization such that it can readily be mounted on or within the enclosure of the electrical device that it controls.

Another specific object of the invention is to provide a simple and economical control device responsive to daylight to turn lights on in the evening and off in the morning.

Another specific object of the invention is to provide an on-off system of the aforementioned type with improved means for preselecting or adjusting the differential between energization and restoration of the load device.

Other objects and advantages of the invention will hereinafter appear.

BRIEF DESCRIPTION OF THE DRAWINGS

These and other objects and advantages of the invention and the manner of obtaining them will best be understood by reference to the following description of preferred embodiments of on-off control systems taken in conjunction with the accompanying drawings, wherein:

FIG. 2 is a group of wave forms showing operating characteristics of the system of FIG. 1;

FIG. 4 is a group of wave forms showing operating characteristics of the system of FIG. 3;

DESCRIPTION OF THE PREFERRED EMBODIMENTS

Figure 1:
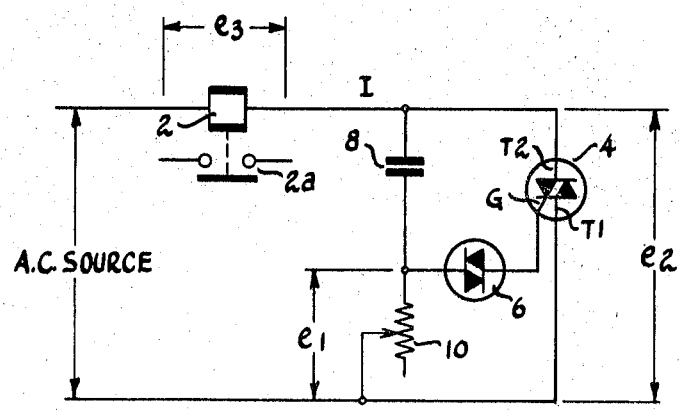
FIG. 1 is a schematic circuit diagram of an on-off control system showing the basic concepts of the invention.

Referring to FIG. 1, there is shown an on-off control system constructed in accordance with the fundamental concepts of the invention. As shown therein, an inductive load device such as the operating coil 2 of an electromagnetic relay or so-called "power contactor" is controllably energized from an alternating current source. Contactor 2 is provided with one or more contacts 2a whereby circuits to lamps or other desired load devices are closed.

As shown in FIG. 1, the system is provided with control means affording on-off, or switching, control of the operating coil 2. This means that the operating coil is abruptly energized and abruptly deenergized as desired rather than by any gradual mode. That is, when the coil is energized, enough current is applied suddenly, positively to cause the relay to pick up so that there will be no chatter or teasing of the relay contacts. And when the relay coil is deenergized, the energy is suddenly cut off so that the relay positively drops out without any teasing action or delay.

The aforementioned control means comprises a solid state switching element and firing control means therefor which provides the switching action. The solid state element is preferably a bidirectional power control element 4 which is an A.C. switching element called a "Quadrac" or "Triac" and is provided with main terminals T1 and T2 and a control gate G. Terminals T1 and T2 are connected in series with coil 2 across the A.C. source. The firing control means comprises a bidirectional device such as a trigger diode 6 and a capacitor 8 and a variable resistor 10. Trigger diode 6 is an A.C. breakover element called a "Trigger" or "Diac" and is connected from the junction between the capacitor and variable resistor to gate G.

It will be noted that capacitor 8 and variable resistor 10 have been interchanged from the positions normally occupied by them in proportional control systems and the like. That is, capacitor 8 is connected between terminal T2 and trigger diode 6. Also, adjustable resistor 10 across which the breakover potential is developed is connected between terminal T1 and the trigger diode. These connections along with the inductive load device give the snap operation or step function hereinafter described to provide on-off control.

The operation of the system of FIG. 1 will be described in conjunction with the wave forms shown in FIG. 2. Curve (a) in FIG. 2 depicts the wave form of the voltage $e_2$ appearing across terminals T1 and T2 of the Quadrac before it is fired or, in other words, the supply voltage wave. As will be apparent, this is the conventional sine wave of voltage of the A.C. source. Curve (b) in FIG. 2 depicts the wave form of the voltage $e_1$ appearing across resistor 10. This voltage on resistor 10 leads the supply voltage as shown in FIG. 2 since the current producing it flows through capacitor 8.

While curves (a) and (b) depict conditions existing just before the Quadrac is fired, that is, before the tap on resistor 10 has been adjusted to trigger diode breakover value, the remaining curves (c) through (f) depicts conditions existing or occurring after the tap on resistor 10 has been adjusted to trigger diode breakover value. Curve (c) shows that the voltage across the main terminals of the Quadrac drops practically to zero value when the Quadrac fires. Curve (d) shows the voltage $e_1$ on resistor 10 and the positive spike therein substantially exceeding the breakover value causing diode 6 to trigger to fire the Quadrac. Curve (e) shows the voltage $e_3$ appearing across the load or, in other words, the supply voltage wave. It will be apparent that this voltage is in phase with the voltage which appeared across the main terminals of the Quadrac before it was fired. Curve (f) shows the current flowing in the load, that is, in coil 2. As will be apparent, this current wave lags the load voltage wave (e) as it should since an inductive load is involved.

Referring again to FIG. 1, it will be apparent that when resistor 10 has a small value, the voltage thereacross will not reach the breakover or triggering potential of diode 6 during any half-cycle of supply voltage and the Quadrac will not be fired. This voltage across resistor 10 before it reaches the breakover voltage of the trigger diode is shown in FIG. 2(b).

When the tap on resistor 10 is moved to increase its resistance, the voltage across it will reach the breakover potential of the trigger diode as shown in FIG. 2(d). As a result, the diode will trigger sending a pulse of current into the gate of the Quadrac to fire the latter into conduction. As shown in FIG. 2(c), the voltage across the Quadrac decreases substantially to zero value when it is fired. The supply voltage now appears across coil 2 as shown in FIG. 2(e) and has a small jog in it at the point where the Quadrac is fired. Also, the current flowing in the load, coil 2, is as shown in FIG. 2(f).

Abrupt switching action is obtained on each half-cycle of supply voltage by reason of the fact that in the inductive load circuit the voltage has already risen to a substantial magnitude by the time the current decreases to zero value and the Quadrac ceases conduction. As shown by curve (f) in FIG. 2, the Quadrac stops conducting when current I flowing in it decreases to zero value at point X. But at this time since the current lags the voltage, the voltage has already reached a substantial value or almost full value as shown by curve (e) in FIG. 2. Since the load is inductive, a voltage will quickly appear across the Quadrac and it will rise rapidly as a step function. The impedance of capacitor 8 to this rapidly rising voltage is small; thus, voltage $e_1$ on resistor 10 becomes proportionately large and triggers diode 6 to fire the Quadrac. As shown by the curves in FIG. 2, as soon as the current shown by curve (f) goes to zero, a positive voltage spike shown by curve (d) appears on resistor 10, far exceeding the breakover voltage of the trigger diode. Therefore, the diode triggers immediately to fire the Quadrac. In this manner, the load receives substantially the entire A.C. current wave.

Figure 3:
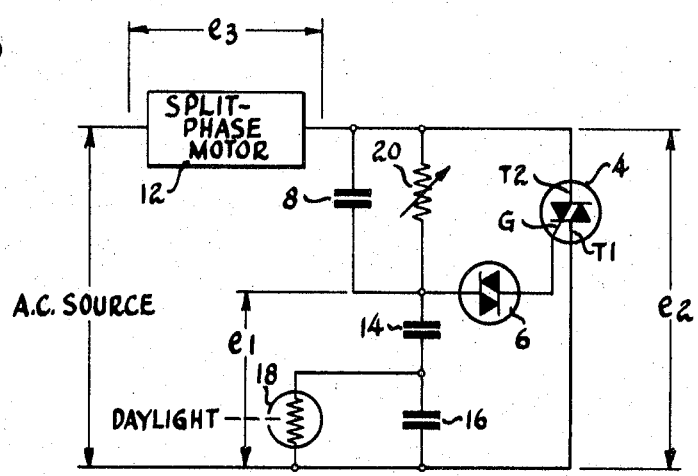
FIG. 3 is a schematic circuit diagram of an on-off control system constructed in accordance with the invention to function as a condition responsive system for motor control.

The circuit diagram in FIG. 3 shows a condition responsive on-off application of the invention. In this circuit diagram, reference characters like those in FIG. 1 are used for like elements. As shown therein, the main terminals of "Quadrac" 4 are connected in series with an inductive load such as a split phase motor 12 across the A.C. source. Trigger diode 6 is connected to gate G of the Quadrac and capacitor 8 is connected between terminal T2 of the Quadrac and the trigger diode.

For developing the breakover voltage for the trigger diode, the adjustable resistor of FIG. 1 has been replaced in FIG. 3 by a pair of capacitors, that is, a capacitor 14 and a relatively smaller capacitor 16 connected in series in that order from the junction between trigger diode 6 and capacitor 8 to terminal T1 of the Quadrac. A condition responsive device 18 is connected across smaller capacitor 16 to drain current off it in proportion to a variable external condition. This condition responsive device is shown as a variable resistor sensor such as a photoresistor of the cadmium sulphide type or the like. This photoresistor has a negative light coefficient of resistance and responds to variation of daylight impinging thereon to lower its resistance in response to increase in light intensity and vice versa.

An adjustable resistor 20 is connected across capacitor 8 whereby the light intensity at turn-on may be adjusted. Alternatively, the light intensity at which the system turns on may be adjusted by adjusting the size of the aperture through which light enters the photoresistor. Capacitor 8 may be adjustable or its capacitance may be selected to set the differential light intensity between turn-on and turn-off. This capacitor must be large enough so that the system turns on without delay. The functions of these elements are hereinafter more fully described.

The operation of the system of FIG. 3 will now be described in conjunction with the wave forms shown in FIG. 4. Curve (a) in FIG. 4 depicts the wave form of the voltage appearing across terminals T1 and T2 of the Quadrac before it is fired or, in other words, the supply voltage wave. This is the conventional sine wave of voltage of the A.C. source. Curve (b) shows the control voltage wave form which will trigger the diode when its magnitude is increased sufficiently. This voltage lags the supply voltage slightly apparently due to the inductance in the circuit provided by the motor load.

While curves (a) and (b) depict conditions existing before the Quadrac is fired, the remaining curves (c) through (f) depict conditions existing or occurring after the resistance of photoresistor 18 has increased enough to cause the voltage on capacitors 14 and 16 to initiate breakover of the trigger diode. Curve (c) shows the voltage across the main terminals of the Quadrac and how it increases rapidly when the current therethrough goes to zero value. Curve (d) shows the control voltage and the positive spike therein causing breakover of the trigger diode. Curve (e) shows the voltage appearing across the motor and the characteristic therein at the points in time when the Quadrac stops conducting current and when it is refired. And curve (f) shows the current flowing in the motor. As shown, this current wave lags the motor voltage wave as it should since an inductive circuit is involved.

When darkness approaches to decrease the amount of light entering through the aperture to photoresistor 18, its resistance increases thereby to reduce the drain of current from capacitor 16. The result of this is that on each half-cycle of A.C. voltage, due to the charging of capacitors 14 and 16, the voltage at the junction between resistor 20 and capacitor 14 increases faster. There comes a time when the photoresistor causes the voltage at this junction to reach the breakover value of the trigger diode 6. This voltage is some value higher than that shown in FIG. 4(b). This voltage will cause firing of the Quadrac on each half-cycle of the A.C. supply.

As shown in FIG. 4, a step function voltage is applied to the trigger diode. When the current decreases to zero value as shown by curve (f), the supply voltage which is leading as shown by curve (e) has reached a substantial value. Since the current in the Quadrac goes to zero value, the voltage across it increases suddenly as shown by curve (c). This voltage is applied across the control circuit to cause a sudden jump in the voltage at the junction connected to the trigger diode as shown by the initial vertical portion of curve (d). Since capacitor 8 presents a low impedance to this steep wave front voltage, the voltage at the trigger diode junction also increases at a faster rate as shown by the steep slope of curve (d). This provides substantially a step function voltage exceeding the breakover value for triggering the diode.

When the diode triggers and fires the Quadrac, the voltage across the latter reduces to zero value as shown by curve (c). Also, the load voltage increases and then follows the normal sine wave as shown by curve (e). And current flows as shown by curve (f).

Figure 5:
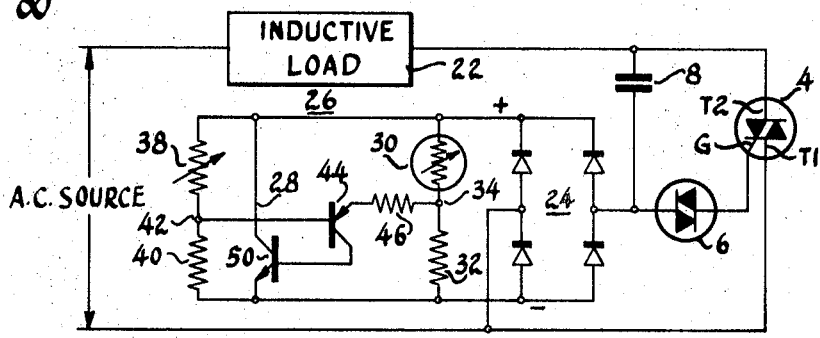
FIG. 5 is a schematic diagram of a modification of the system of FIG. 1 providing a more sensitive, condition responsive control system.

The circuit in FIG. 5 is similar to that in FIG. 1 except that control resistor 10 of FIG. 1 has been replaced by a condition responsive bridge circuit such as a transistor-thermistor bridge circuit.

In FIG. 5, Quadrac 4 is connected in series with an inductive load 22 across an A.C. source. Trigger diode 6 is connected to gate G and capacitor 8 is connected from terminal T2 of the Quadrac to the trigger diode as in FIG. 1. The transistor-thermistor bridge circuit is connected between the trigger diode and the other terminal T1 of the Quadrac.

This transistor-thermistor bridge circuit comprises a rectifier bridge 24, a resistance bridge 26 and a shunt circuit 28. Rectifier bridge 24 is a full-wave bridge having its input terminals connected to diode 6 and terminal T1. The positive and negative output terminals of the rectifier bridge are connected across the input terminals of resistance bridge 26. Resistance bridge 26 has two branches connected in parallel across the output terminals of the rectifier bridge. The first branch has a thermistor 30 and a resistor 32 connected in series with a junction 34 therebetween. The second branch has an adjustable resistor 38 and a resistor 40 connected in series with a junction 42 therebetween. Junctions 34 and 42 which are the output terminals of the resistance bridge are connected respectively to the emitter and base of a control (PNP) transistor 44, there being a resistor 46 in the emitter circuit of the transistor to set or adjust the gain.

Shunt circuit 28 is connected in parallel with the resistance bridge across the output terminals of the rectifier bridge. This shunt circuit comprises a shunt (NPN) transistor 50 having its collector and emitter connected from the positive output terminal of the rectifier bridge to the negative output terminal thereof. The collector of control transistor 44 is connected directly to the base of shunt transistor 50.

The operation of the system of FIG. 5 will now be described. When the resistance bridge is balanced current will not flow in shunt circuit 28 and the resistance bridge will present a high resistance across the output of the rectifier bridge. Consequently, the diode 6 will be triggered on each half-cycle to fire the Quadrac.

When the temperature increases to decrease the resistance of thermistor 30, the voltage at terminal 34 will rise to cause current flow through resistor 46 and the emitter and base of transistor 44 to terminal 42. This causes transistor 44 to turn on and to turn transistor 50 on. As a result, current will flow in shunt circuit 28 through the collector and emitter of transistor 50. This will reduce the voltage at trigger diode 6 below its breakover value so that the Quadrac will no longer be fired. Consequently, the load will be deenergized.

Figure 6:
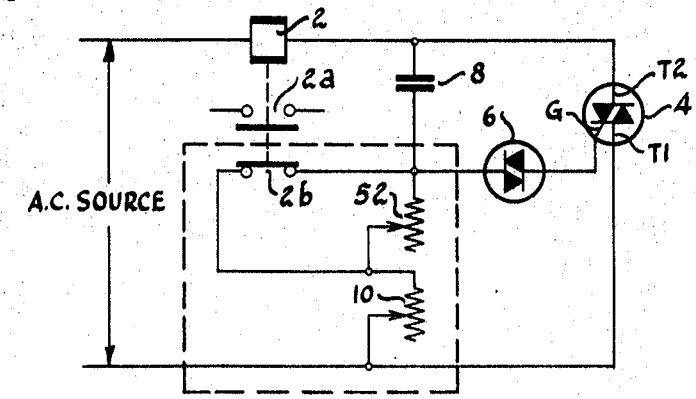
FIG. 6 is a schematic circuit diagram like that in FIG. 1 but modified to include provision for an adjustable differential between the load pickup and dropout values of input signal.

The circuit in FIG. 6 is similar to that in FIG. 1 except that differential adjustment means has been added. Reference characters like those in FIG. 1 are used for like elements. As shown therein, an inductive load device such as the operating coil 2 of a relay or contactor is connected in series with the main terminals T1 and T2 of Quadrac 4 across the A.C. source. Trigger diode 6 is connected to gate G of the Quadrac and capacitor 8 is connected between terminals T2 of the Quadrac and the trigger diode.

For developing the breakover voltage for the trigger diode, adjustable resistor 10 is connected as in FIG. 1 between terminal T1 of the Quadrac and the junction between diode 6 and capacitor 8. Contactor 2 is provided with a normally open contact 2a as in FIG. 1.

The circuit in FIG. 6 is additionally provided with means for preselecting or adjusting the differential between the pickup and dropout points of contactor 2. If input device 10 is assumed to be a manually adjustable resistor, this differential is the difference in input resistance value required to cause pickup and dropout of the contactor. This means comprises a differential adjusting variable resistor 52 and a normally closed contact 2b operable by contactor 2. This variable resistor 52 and contact 2b are connected in parallel with one another and this parallel circuit is connected in series with control resistor 10 between terminal T1 and the trigger diode.

In operation it will be apparent that when control resistor 10 is adjusted to cause energization of contactor 2, contact 2b opens to insert variable resistor 52 effectively in series connection with resistor 10. This causes an upward step in the voltage at the junction between diode 6 and capacitor 8. Consequently, in order to cause deenergization of contactor 2, the value of resistor 10 must be brought down considerably below the value which caused pickup. The difference in these values may be adjusted by varying resistor 52.

Figure 7:
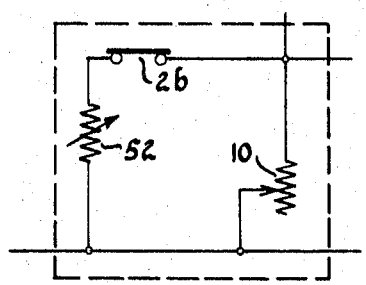
FIG. 7 is a fragmentary circuit diagram showing a modification of FIG. 6.

The modification shown in FIG. 7 consists of connecting differential adjusting resistor 52 in parallel with control resistor 10 instead of in series therewith as in FIG. 6. As will be apparent, this fragmentary circuit in FIG. 7 may be subsituted in place of the broken line portion in FIG. 6.

The parallel arrangement shown in FIG. 7 may be used depending upon the amount of differential or differential adjustment desired. Since the equivalent conductance (reciprocal of resistance) is equal to the sum of the individual conductances of the parallel resistance paths, it will be apparent that the equivalent or total resistance of the parallel circuit is always less than the smallest individual resistance. All that is necessary, therefore, is to preselect the values so that the value of resistor 10 is larger than the total resistance by the required differential amount. Thus, when the contactor picks up and contact 2b opens, the resistance value steps up from the parallel equivalent value to the value of resistor 10.

Figure 8:
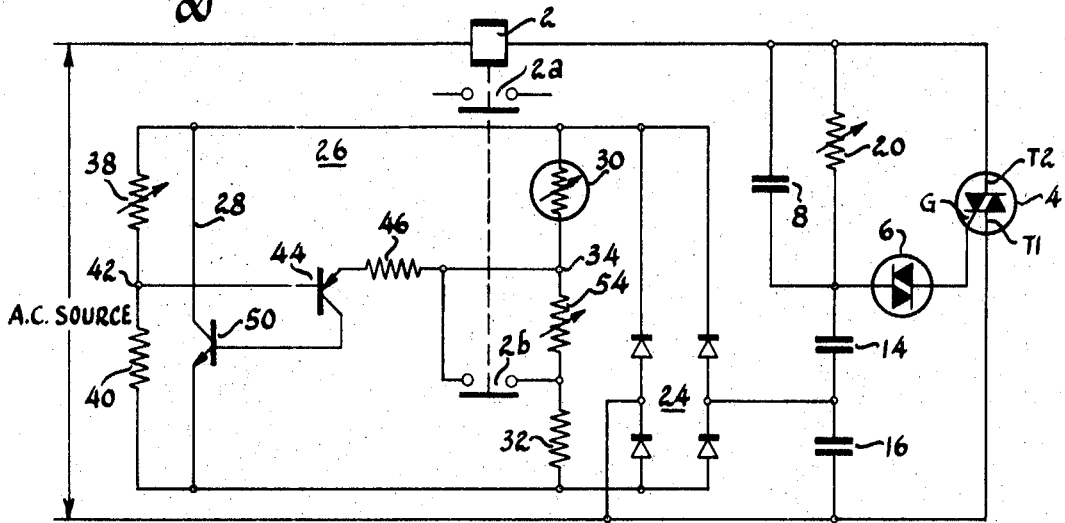
FIG. 8 is a schematic circuit diagram of a modification of the system of FIG. 3 providing a still more sensitive condition responsive control system than that shown in FIG. 5 and including provision for an adjustable differential between the load energization and deenergization values of input signal.

The modification shown in FIG. 8 is similar to the circuit in FIG. 3 except that a bridge circuit has been used in place of condition responsive device 18 thereof and differential adjustment means has been added. This bridge circuit is generally similar to that shown in FIG. 5 with the incorporation therein of differential adjustment means. Reference characters like those in FIGS. 3 and 5 have been used for like elements to facilitate identification of the parts.

In FIG. 8, the coil of contactor 2 is connected in series with the main terminals T1 and T2 of Quadrac 4 across the A.C. source. Trigger diode 6 is connected to gate G and capacitor 8 is connected from terminal T2 to the trigger diode. An adjustable resistor 20 is connected across capacitor 8 whereby the value of condition at contactor pickup may be adjusted. For developing the breakover voltage for the trigger diode, a capacitor 14 and a relatively smaller capacitor 16 are connected in series in that order from the junction between trigger diode 6 and capacitor 8 to terminal T1 of the Quadrac. A transistor-thermistor bridge circuit is connected across smaller capacitor 16 to drain current off it in proportion to a variable external condition. While a thermistor is described in the illustrated embodiment, it will be apparent that other condition responsive devices could be used in place thereof. It will be appreciated that the bridge circuit is a much more sensitive device than device 18 in FIG. 3. Therefore, by using such bridge circuit to drain current off from the smaller of two series capacitors, a very sensitive and stable operating system is provided.

As shown in FIG. 8, the transistor-thermistor bridge circuit comprises a rectifier bridge 24, a resistance bridge 26, a shunt circuit 28 and differential adjustment means hereinafter described. Rectifier bridge 24 is a full-wave bridge having its input terminals connected across capacitor 16. The output terminals of the rectifier bridge are connected across the input terminals of resistance bridge 26. The latter has two branches connected in parallel across the output of the rectifier bridge. The first branch has a thermistor 30, or other sensor device, and a resistor 32 connected in series with a junction 34 therebetween as in FIG. 5 with the interposition of a differential adjustment device in this series circuit as hereinafter described. The second branch has an adjustable resistor 38 and a resistor 40 connected in series with a junction 42 therebetween. Junctions 34 and 42 which are the output terminals of the resistance bridge are connected respectively to the emitter and base of a control transistor 44 of the PNP type, there being a resistor 46 in the emitter circuit to set or adjust the gain.

Shunt circuit 28 is connected in parallel with the resistance bridge across the output terminals of the rectifier bridge. This shunt circuit comprises a shunt transistor 50 of the NPN type having its collector and emitter connected from the positive output terminal of the rectifier bridge to the negative output terminal thereof. The collector of control transistor 44 is connected directly to the base of shunt transistor 50.

The aforementioned differential adjustment means comprises a variable resistor connected in the appropriate branch of the resistance bridge and a contact on the contactor for controlling connection of such resistor in the circuit. For illustrative purposes, a variable resistor 54 is shown connected between resistor 32 and junction 34. A normally open contact 2b of contactor 2 is connected across resistor 54.

In operation, let it be assumed that a heater is being controlled and that contactor 2 is initially not energized. As a result, the temperature is falling and the resistance of thermistor 30 is increasing. If the heater is required to be turned on at 60 degrees, the current drain from capacitor 16 is reduced to such an extent by shifting the bridge toward balance that diode 6 triggers and fires the Quadrac at 60 degrees temperature. This causes energization of contact 2 and closure of contact 2a to energize the heater. Contact 2b closes to shunt resistor 54 out of circuit. This effects lowering of the voltage at junction 34 a step whereby this lower voltage is now applied to the emitter of transistor 44. This means that the resistance of thermistor 30 must be decreased that much more to enable the system to be turned off. This further decrease in thermistor resistance requires a higher temperature than 60 degrees, say 75 degrees. This differential in temperature between turn on and turn off of the heater may be adjusted by varying the value of resistor 54.

What is claimed is:

1. In a power switching control system, the combination comprising:
   an alternating current source;
   an inductive load device;
   a circuit for connecting electrical power from said alternating current source to said inductive load device including a controllable gating type solid state power control element in circuit with said load device and source;
   a trigger diode having one terminal connected to the gate of said power control element;
   and means providing on-off switching action control of said inductive load device comprising:
   impedance means connected between the other terminal of said trigger diode and that terminal of said power control element across which the breakover voltage is normally developed;
   said impedance means comprising a large and small capacitor in series connection and a variable resistance device connected across the smaller capacitor for draining current therefrom whereby the rate of current drain determines whether the voltage at the trigger diode reaches its breakover value;
   and a capacitor connected across said other terminal of the trigger diode and the other terminal of said power control element and being of a size whereby it presents a low impedance to current flow in response to the step function voltage which appears across said power control element due to the leading voltage wave when the current flowing in the latter decreases to zero value.

2. In a power switching control system, the combination comprising:
   an alternating current source;
   an inductive load device;
   a circuit for connecting electrical power from said alternating current source to said inductive load device including a controllable gating type solid state power control element in circuit with said load device and source;
   a trigger diode having one terminal connected to the gate of said power control element;
   and means providing on-off switching action control of said inductive load device comprising:
   impedance means connected between the other terminal of said trigger diode and that terminal of said power control element across which the breakover voltage is normally developed;
   a capacitor connected across said other terminal of the trigger diode and the other terminal of said power control element and being of a size whereby it presents a low impedance to current flow in response to the step function voltage which appears across said power control element due to the leading voltage wave when the current flowing in the latter decreases to zero value;

means for preselecting the differential between the value of said impedance means at which the load is energized and the value of said impedance means at which the load is deenergized;

and means responsive to energization of said load device for rendering said differential preselecting means effective to control deenergization of the load device.

3. In a condition responsive on-off control system, the combination comprising:

an alternating current source;

an inductive load device;

a circuit for connecting electrical power from said alternating current source to said inductive load device including a gating type bidirectional semiconductor element in circuit with said load device and source;

a trigger diode having one terminal connected to the gate of said semiconductor element;

and means providing switching action control of said inductive load device comprising:

a condition responsive variable resistance circuit connected from the other terminal of said trigger diode to that terminal of said semiconductor element across which the breakover voltage is normally developed;

means connected across said other terminal of the trigger diode and the other terminal of said semiconductor element to present a low impedance to current flow in response to the steep wave front voltage which appears across said semiconductor element as a result of the leading voltage caused by the inductive load device when the current flowing in said semiconductor element and which lags the voltage decreases to zero value thereby to develop on said condition responsive variable resistance circuit a voltage spike exceeding the breakover value of said trigger diode;

said low impedance presenting means comprising a capacitor having a capacitance value large enough to insure clear and reliable energization of the load device and to set the condition differential between energization and deenergization of the load device;

and adjustable resistor means connected across said capacitor for setting the value of external condition at which the load device is energized.

References Cited

UNITED STATES PATENTS

| | | | |
|---|---|---|---|
| 3,242,346 | 3/1966 | Skoubo | 323—22X(SCR) |
| 3,244,964 | 4/1966 | Greening et al. | 323—22(SCR) |
| 3,422,309 | 1/1969 | Spira et al. | |
| 3,430,101 | 2/1969 | Biltz | 323—22X(SCR) |
| 3,434,039 | 3/1969 | Misencik et al. | 323—22(SCR) |

OTHER REFERENCES

J. H. Galloway, "Using The Triac For Control Of AC Power," G.E. Application Note No. 200.35, March, 1966, p. 15.

LEE T. HIX, Primary Examiner

U.S. Cl. X.R.

307—305; 317—148.5